US009048037B2

(12) United States Patent
Evans et al.

(10) Patent No.: US 9,048,037 B2
(45) Date of Patent: Jun. 2, 2015

(54) LINEAR AUTOMATIC TRANSFER SWITCH AND SWITCHING MEANS

(75) Inventors: Arthur Evans, Chicago, IL (US); Henry Yu-Heng Lee, Dublin, CA (US); Kok-Hann Lew, Chicago, IL (US)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 13/399,407

(22) Filed: Feb. 17, 2012

(65) Prior Publication Data

US 2013/0214605 A1 Aug. 22, 2013

(51) Int. Cl.
*H02J 1/00* (2006.01)
*H01H 1/36* (2006.01)
*H01H 3/26* (2006.01)

(52) U.S. Cl.
CPC ................. *H01H 1/365* (2013.01); *H01H 3/26* (2013.01); *H01H 2300/018* (2013.01)

(58) Field of Classification Search
USPC ........................................................... 307/85
See application file for complete search history.

(56) References Cited

U.S. PATENT DOCUMENTS 4,760,278 A 7/1988 Thomson
5,070,252 A * 12/1991 Castenschiold et al. ........ 307/64
5,397,868 A 3/1995 Smith et al.
5,942,901 A * 8/1999 Cochran et al. ............... 324/555
6,995,327 B1 * 2/2006 Shepstone et al. ......... 200/50.32
7,667,154 B2 2/2010 Dolinski
7,888,816 B2 2/2011 Zajkowski

OTHER PUBLICATIONS

"Automatic Transfer Switches", North America, Cummins Power Generation, www.cummingspower.com, pp. 1-9 (2007).
A. Talukdar et al, "Architectural Demonstration of Single Pole Quad Throw (SPQT) MEMS Switch", Canadian Journal on Electrical Electronics Engineering, vol. 2, No. 4, Apr. 2011, p. 124-129.
"Transfer Switch OT III Open or Delayed Transition, Non-Automatic", Cummins Power Generation, pp. 1-5, 2007.

* cited by examiner

*Primary Examiner* — Jared Fureman
*Assistant Examiner* — Duc M Pham
(74) *Attorney, Agent, or Firm* — Nixon & Vanderhye P.C.

(57) ABSTRACT

A transfer switch including: a bus bar; a track parallel to the bus bar; a first power source connection proximate to the track; a second power source connection proximate to the track offset along the track from the first power source connection; a conductive core slidably coupled to the track, wherein the core includes a deformable array of conductive sections and the array includes contacting surfaces on opposite sides of the array; wherein the conductive core has a first position providing a conductive coupling between the bus bar and the first power source and a second position providing a conductive coupling between the bus bar and the second power source.

20 Claims, 6 Drawing Sheets

LINEAR AUTOMATIC TRANSFER SWITCH AND SWITCHING MEANS

BACKGROUND OF THE INVENTION

The invention relates to transfer switches that transfer electrical power from multiple power sources to a power load.

Transfer switches are used, for example, to automatically and quickly connect an emergency power source to a load when a normal power supply fails. Hospitals use transfer switches to maintain continuous electrical power when a power failure occurs in the electrical utility service to the hospital. When a utility power failure occurs, the transfer switch connects the hospital to a backup power generator without significant interruption of electrical power to the hospital. There is a long felt need for mechanically simple and reliable transfer switches which effectively suppress electrical arcs.

SUMMARY OF INVENTION

A transfer switch has been conceived including: a bus bar; a track parallel to the bus bar; a first power source connection proximate to the track; a second power source connection proximate to the track offset along the track from the first power source connection; a conductive core slidably coupled to the track, wherein the core includes a deformable array of conductive sections and the array includes contacting surfaces on opposite sides of the array; wherein the conductive core has a first position providing a conductive coupling between the bus bar and the first power source, wherein the second power source is electrically isolated from the bus bar when the core is in the first position; wherein the conductive core has a second position providing a conductive coupling between the bus bar and the second power source, wherein the first power source is electrically isolated from the bus bar when the core is in the first position, and wherein the core slides along the track between the first position and the second position.

The deformable array may be an array of trapezoidal conductors having abutting surfaces. The trapezoidal conductors may include opposing first trapezoidal conductors each having one of the contact surfaces and opposing second trapezoidal conductors each extending between the first trapezoidal conductors. The abutting surfaces may be planar surfaces and oblique to a plane of the contacting surfaces.

The transfer switch may include a spring applying a bias force against the deformable array, wherein the bias force moves the contacting surfaces outward. The transfer switch may also include a pair of arc extinguishers adjacent each of the contacting surfaces when the core is in the first position and a second pair of arc extinguishers adjacent each of the contacting surfaces when the core is in the second position.

A transfer switch has been conceived comprising: a main body having a back plate and a cover, parallel the back plate and separated from the back plate by brackets extending between the back plate and cover; a bus bar mounted to the back plate; a first power source connection mounted to the back plate; a second power source connection mounted to the back plate; a track integral or mounted to the back plate, wherein the bus bar is on one side of the track and the first and second power connectors are on the opposite side of the track; a conductive core slidably coupled to the track, wherein the core includes a deformable array of conductive sections and the array includes contacting surfaces on opposite sides of the array; wherein the conductive core has a first position providing a conductive coupling between the bus bar and the first power source, wherein the second power source is electrically isolated from the bus bar when the core is in the first position; wherein the conductive core has a second position providing a conductive coupling between the bus bar and the second power source, wherein the first power source is electrically isolated from the bus bar when the core is in the first position, and wherein the core slides along the track between the first position and the second position.

A method has been conceived to transfer a power supply connection comprising: establishing a first electrical connection between a power load and a first power source, wherein the connection includes a conductive core having opposite contacting surfaces and the current flows from the first power, through a first of the contacting surfaces, the core, the second of the contacting surfaces and to the power load; applying a bias force to deform the core and thereby press the contacting surfaces against respective electrical contacts for the power load and first power source; sliding the core out of contact with the first power source and into contact with the second power source, wherein the sliding breaks the electrical connection between the power load and the first power source and establishes a second electrical connection between the power load and second power source.

BRIEF DESCRIPTION OF THE INVENTION

The structure, operation and features of the invention are further described below and illustrated in the accompanying drawings which are:

FIG. 2 is a perspective view the transfer switch with the top cover removed.

DETAILED DESCRIPTION OF THE INVENTION

Figure 1:
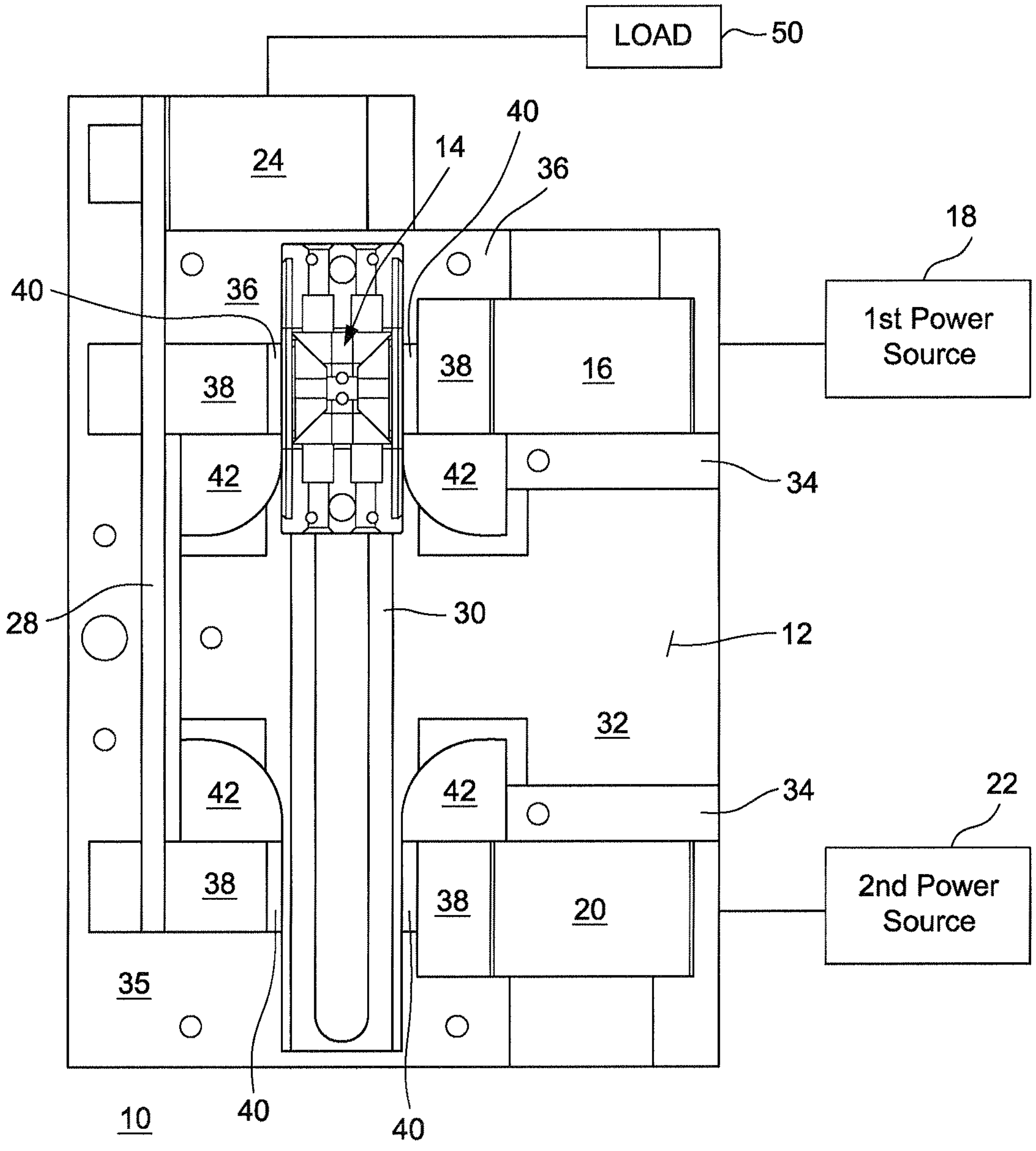
FIGS. 1 and 2 show schematically a transfer switch with a top cover removed.

FIG. 1 is a front view of a transfer switch 10 having a main body 12 and a moveable core 14. The main body houses a first power connector 16 for a first power source 18, a second power connector 20 for a second power source 22 and a load connector 24 for a power load 26. The core 14 provides an electrical connection between one the power connectors 16, 20 and a conductive bus bar 28, which is also connected to the load connector 24.

The core 14 connects the conductive bus bar to one of the power connectors by being a physical and electrical bridge between the power connector and bridge. The core 14 is posited between the power connector and bus bar to form the bridge. The core slides linearly along a track 30 extended between the power connectors 16, 20, and the bus bar 28. By sliding along the track, the core is positioned between a selected one of the power connectors and the bus bar to establish an electrical connection between the selected power connector and the bus bar.

The main body 12 of the transfer switch may include a back plate 32 formed of a rigid insulating material such as a molded plastic or a composite. The back plate provides structural support for the components of the main body. On the back plate are mounted the track 30, which may have twin parallel rails along which the core slides. The rails may provide a mount to support the core on the back plate. The rails may slidably engage the core and prevent rotation of the core about the rails. Alternatively, the track may be integral with the back plate.

The connectors 16, 20, 24 may be conductive metal blocks having a female or male coupling to receive a male or female coupling from a conductive conduit between the transfer switch 10 and one of the power sources or load. For example, the connector 16 may be an aluminum block having an opening to receive the end of a conductive wire which is connected to the first power source 18.

The first and second connectors 16, 20 may be fixed to brackets 34 extending perpendicular to the back plate. Similarly, the connector 24 for the load may be supported by a bracket 36. The brackets may be attached to the back plate or integral with the back plate. Other brackets for the bus bar 28 and other components of the transfer switch 10 may extend perpendicular to the back plate. The brackets may be integrally molded with the back plate.

Junction connectors 38 provide an electrical coupling between the core 14 and each of the connectors 16, 20 and the bus bar 28. The junction connectors 38 may be metal blocks, such as aluminum cubes, that include a protrusion 40 extending towards the core position. The protrusions are each configured to contact the core and provide a low resistance, reliable and releasable connection to the core.

Arc extinguishers 42 are adjacent each of the junction connectors 38. The arc extinguishers may include a chamber to receive high temperature electrical arcs when the core slides between the junction connectors. Arc extinguishers are conventional devices used to capture and suppress electrical arcs.

The arc extinguishers 42 may be formed of a non-conducting material and have a chamber divided into passages to receive an arc. The arc extinguishers 42 may have a quarter-circle shape and are adjacent the abutting connection between the core and the junction connectors 38. The abutting connection tends to be the source of an arc especially as the core slides into engagement with the junction connectors. Because of the proximity of the arc extinguishers to the abutting connection an arc passage is not necessary.

Figure 2:
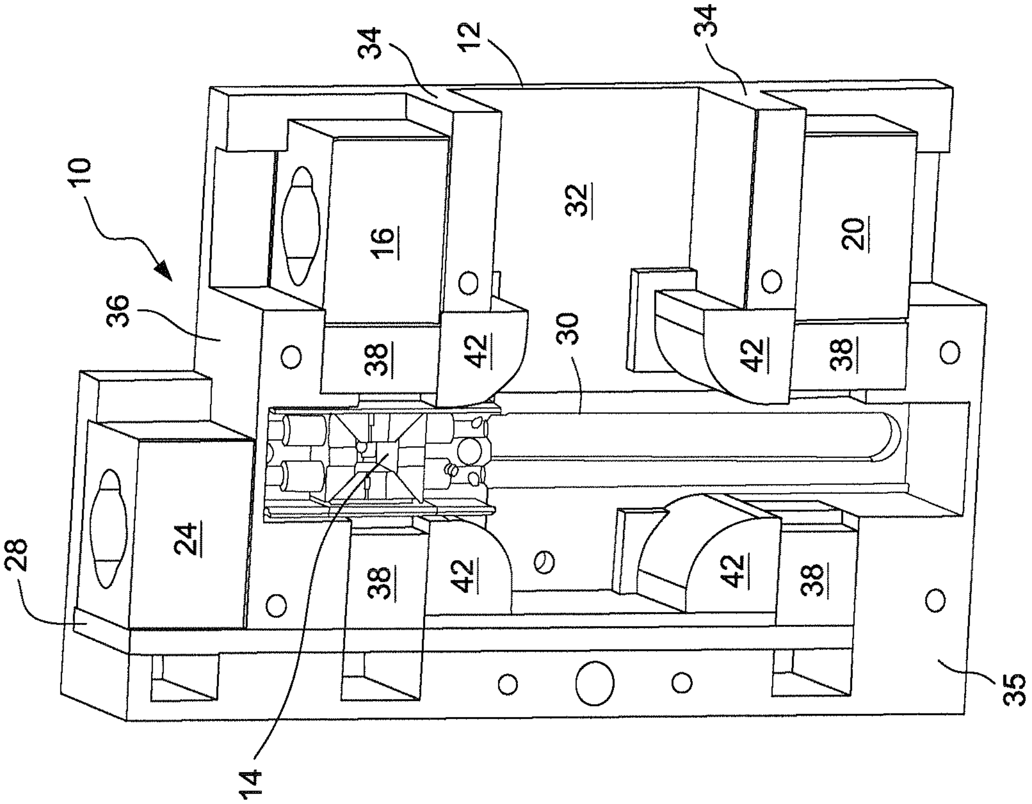

FIG. 2 is a perspective view of the transfer switch 10. The cover of the switch is removed in FIGS. 1 and 2 to show the internal components of the switch. The main body 12 includes the back plate 32, the brackets 34, and other brackets 35, 36 that extend perpendicularly from the back plate. The brackets form side support structures for the stationary components of the transfer switch, such as the first and second power connections 16, 20, the load connection 24, the bus bar 28, and arc extinguishers. The brackets may also form end stops for the core at opposite ends of the track 30. The brackets may also separate the back plate from the top cover and provide structural support for the transfer switch which is transverse to the back plate and top cover.

Figure 3:
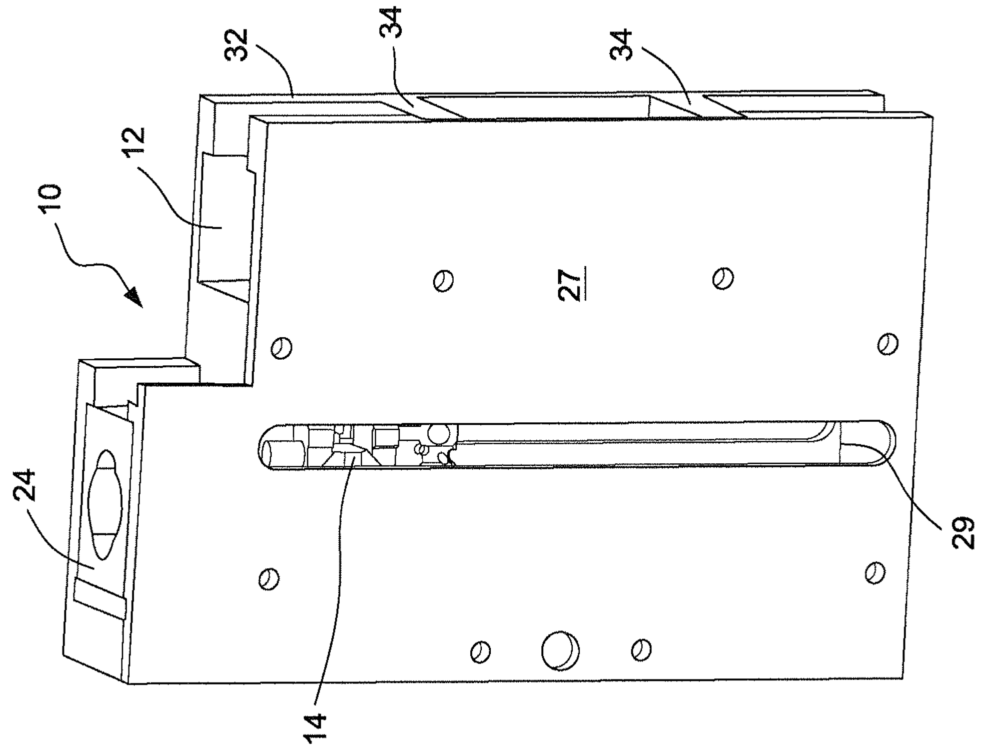
FIG. 3 is a perspective view of the transfer switch with the top cover.

FIG. 3 is a perspective view of the transfer switch with the top cover 27 which may attach to the upper ends of the brackets. The top cover may be superimposed over the back plate and generally conform to the planar shape of the back plate. Alternatively, some or all of the brackets may be integrally formed with the top cover rather than with the back plate. An open slot 29 in the top cover corresponds to the track. A similar open slot may be present in the back plate. The open slot may be used to allow an actuator to extend into the transfer switch to move the core.

Figure 4:
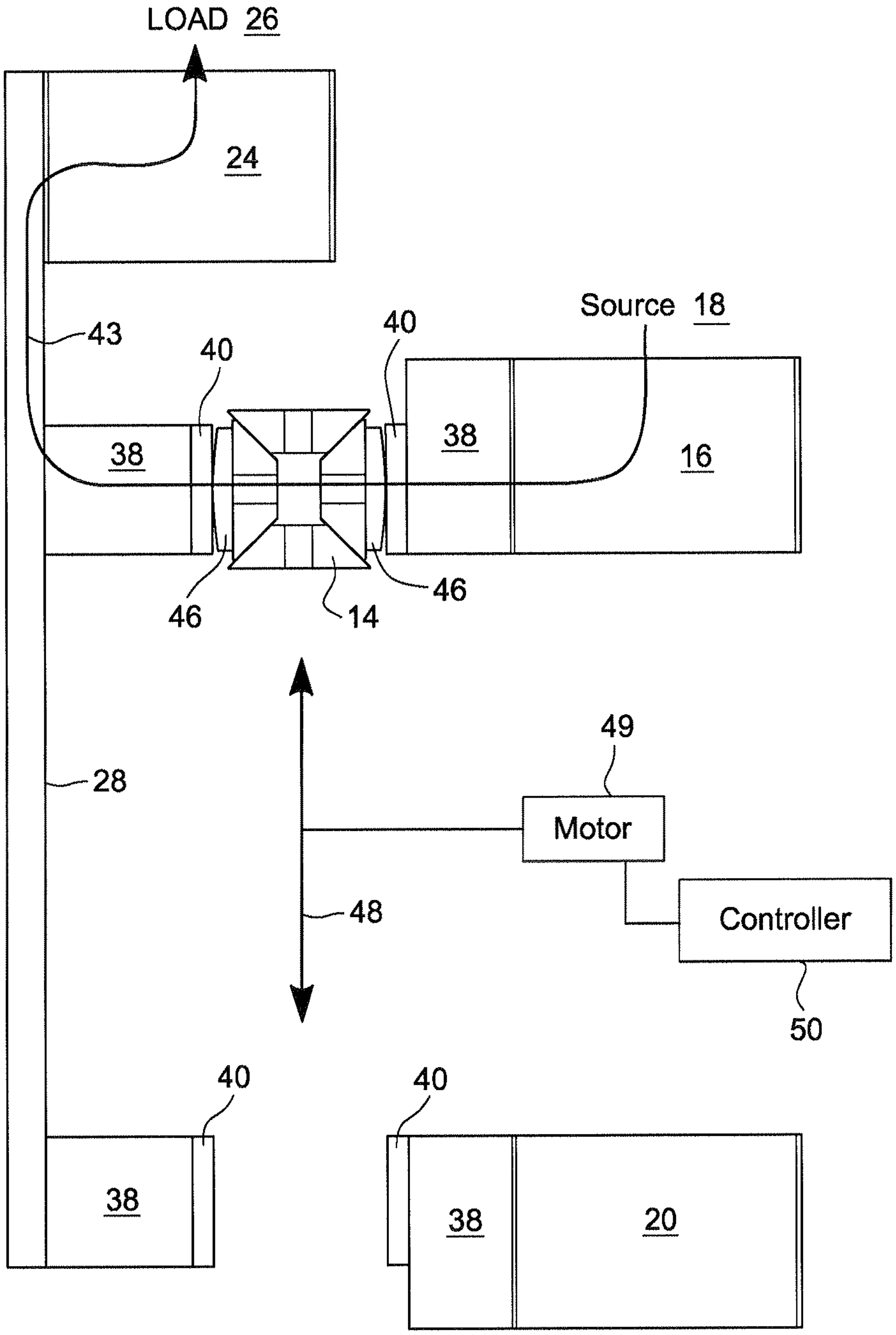
FIGS. 4 and 5 show a core of the transfer switch electrically connecting a first power source to a power load (FIG. 2) and electrically connecting a second power source to the load (FIG. 3).
Figure 5:
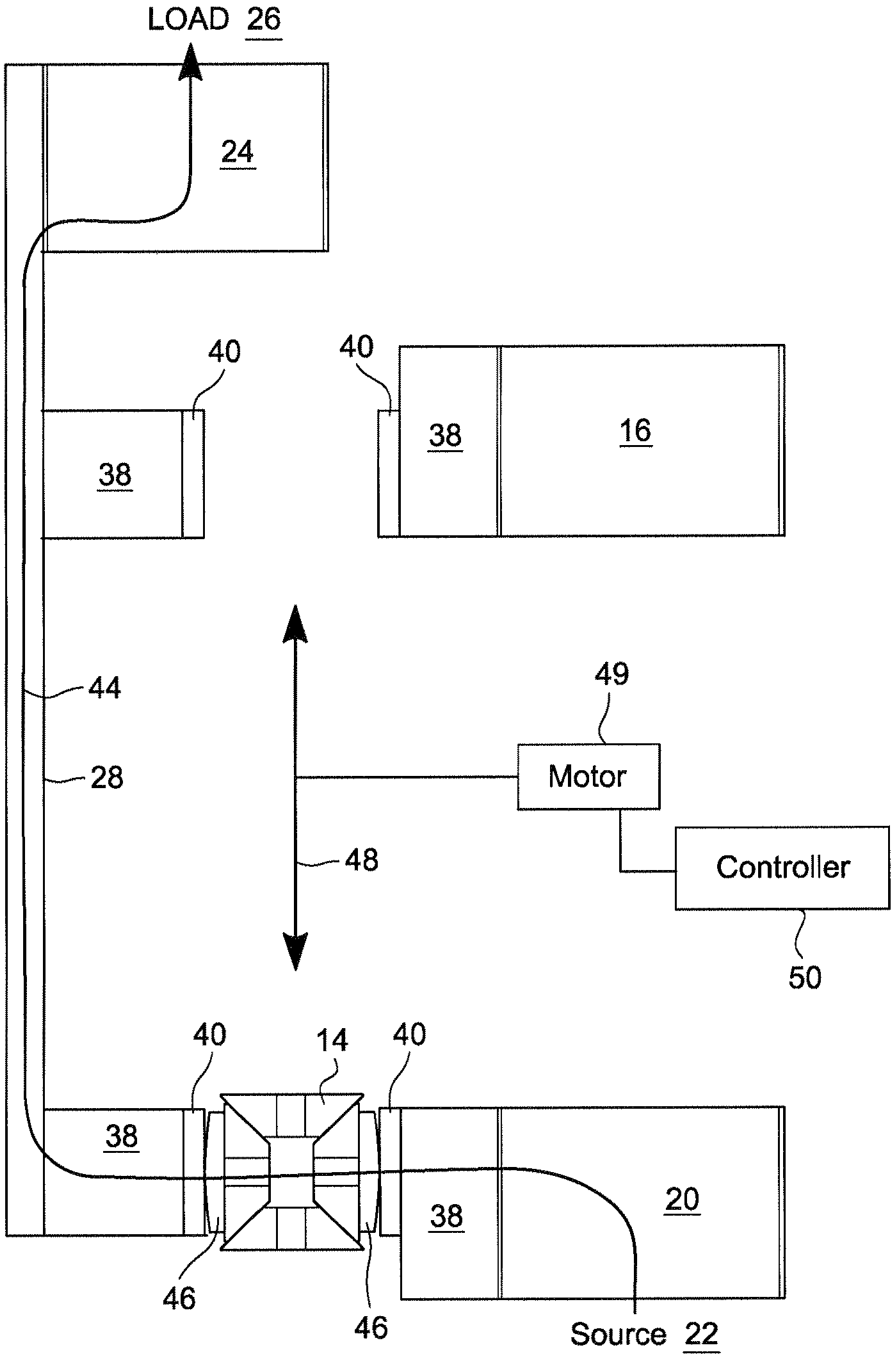

FIGS. 4 and 5 are schematic illustrations showing the core 14 electrically connecting the first power source 18 to the power load 26 (FIG. 2) and the core 14 electrically connecting the second power source 22 to the load 26 (FIG. 3). As shown in FIG. 2, electrical current flows (see arrow 43) from the first power source 18, through the core and to the load 26, when the core is aligned with the first power connection 16. As shown in FIG. 3, electrical current flows (see arrow 44) from the second power source 22, through the core 14 and to the power load 26 when the core is aligned with the second power connection 20.

The core 14 (which is shown in a simplified form in FIGS. 3 and 4) slides between the opposite junction connectors 38 for either the first power source (FIG. 2) or the second power source (FIG. 3). The core has electrical contacts 46 which are biased outwardly to abut against the junction connectors 38. The spring bias force presses the contacts 46 of the core against the protrusions 40 of the junction connectors. The spring bias force ensures a good electrical contact between the core and the junction connectors. The spring bias force does not prevent sliding of the core along the track 30 (FIG. 1) when a moving force is applied to the core.

The core 14 is slid (see arrow 48) linearly between the opposite junction connectors to decoupled the first power source from the power load and connect the second power source to the power load, and vice versa. A motor 49 may apply a moving force to move the core and a controller 50, e.g., computer, made actuate the motor to slide the core when the controller detects a condition, such as a power failure of the first power source. The core may also be configured to be manually moved between the connections for the first and second power sources.

Figure 7:
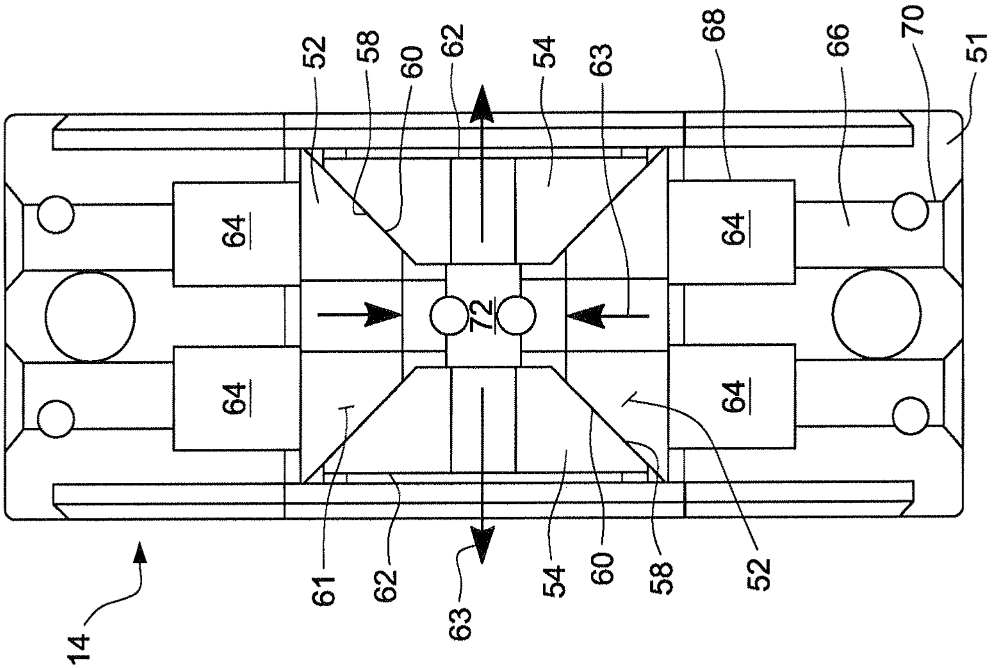
FIGS. 6 and 7 show the internal components of the core.
Figure 6:
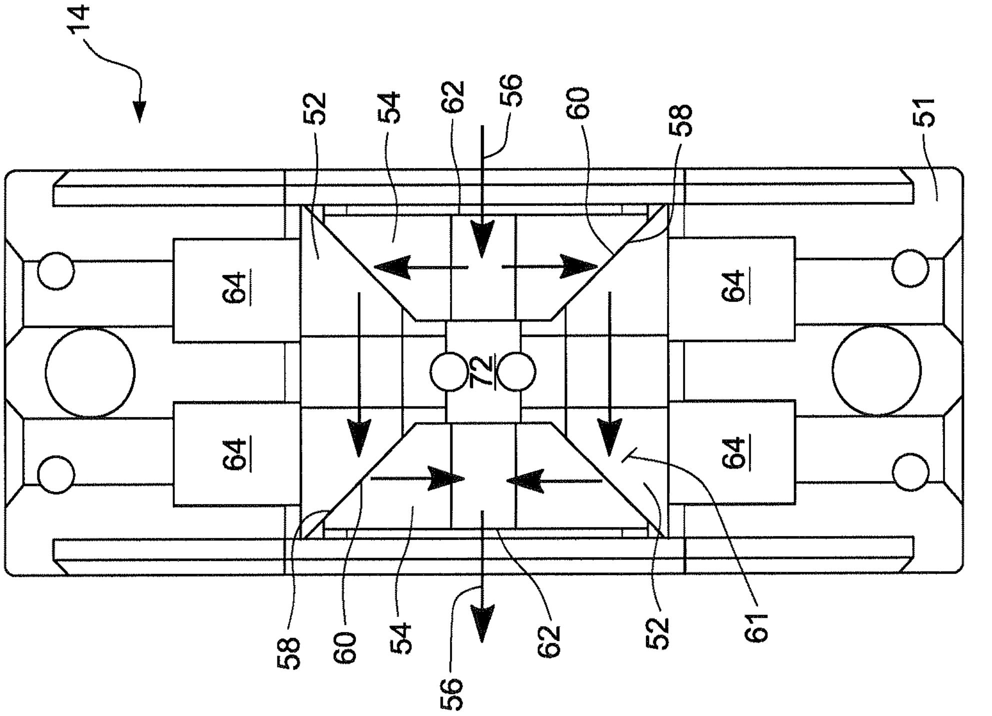

FIGS. 6 and 7 are similar views showing the internal components of the core 14 which may have a split core body formed of opposing body covers 51. A front view of a body cover is shown in FIGS. 6 and 7. The covers may be formed of a non-conductive material, such as a plastic or composite material. The covers may be generally rectangular and have cavities or recesses to receive the components of the core.

The components of the core include trapezoidal conductors 52, 54 arranged in a rectangular deformable array 61. The trapezoidal conductors 54 are adjacent the sides of the core and physically contact the junction connectors 38 (FIG. 1). The other trapezoidal conductors 52 span between the side trapezoidal conductors 54 and extend transversely through the core. The conductors are arranged in a deformable array 61 that forms a conductive path from one side of the core to the other. The arrows 56 show the current path flowing through each of the trapezoidal conductors 52, 54 of the array 61. The conductive path provides an electrical connection between one of the connections 16, 20 to the power source and the bus bar 28. The trapezoidal conductors may alternatively be arc-shaped and arranged in a ring and need not all have a uniform shape.

The trapezoidal conductors 52, 54 each have abutment surfaces 58, 60 which abut and slide against the abutment surfaces 60, 58 of an adjacent trapezoidal conductor. The surfaces 58, 60 of the trapezoidal conductors slide against each other to deform the array 61 and cause the trapezoidal conductors 54 firmly abut against the junction connectors 38 (FIG. 1) and ensure good electrical contact between the core 14 and the junction connectors. The abutment surfaces may be planar and oblique, e.g., at 45 degrees, to a plane parallel to the contacting surfaces between core and the junction connectors.

The sidewalls 62 of the trapezoidal conductors are in firm and constant electrical contact with the junction connectors at least in part due to the sliding that occurs between the surfaces 58, 60 of the trapezoidal conductors 52, 54.

Spring assemblies 64 bias the transverse trapezoidal conductors 52 inward of the deformable conductive array 61 formed by the trapezoidal conductors 52, 54. The spring bias force is applied through the transverse trapezoidal conductors 52 to spread apart the side trapezoidal conductors 54, as is shown by the arrows 63 in FIG. 7 that indicate the mechanical force applied to the trapezoidal conductors. The spring assemblies 64 may include a spring 66, e.g., a helical spring, and a contact block 68 that abuts against the outer wall of the trapezoidal conductor 52.

The spring assembly may be housed in a chamber 70 of the body of the core. The chamber 70 may be capped at an end of the core such that the cap may be removed to replace a spring.

A center region 72 of the array 61 of trapezoidal connectors is open to allow movement of the connectors. As the connectors 52, 54 move and slide with respect to each other, the center region may be altered in shape and size.

During the relative movement of the trapezoidal connectors 52, 54, electrical connections are maintained between each of the connectors due to the sliding contact between the opposing surfaces 58, 60 of the connectors. The connectors 52, 54 may be formed of a conductive material, such as aluminum or steel, or be coated with a conductive material and have an interior that is non-conductive. Further, one of the transverse connectors 52 need not be conductive. In addition, one of the transverse connectors may be stationary and not require associated spring assemblies. Where one transverse connector is stationary, the other transverse connector alone provides the full bias force to spread apart the other trapezoidal connectors 54.

Figure 9:
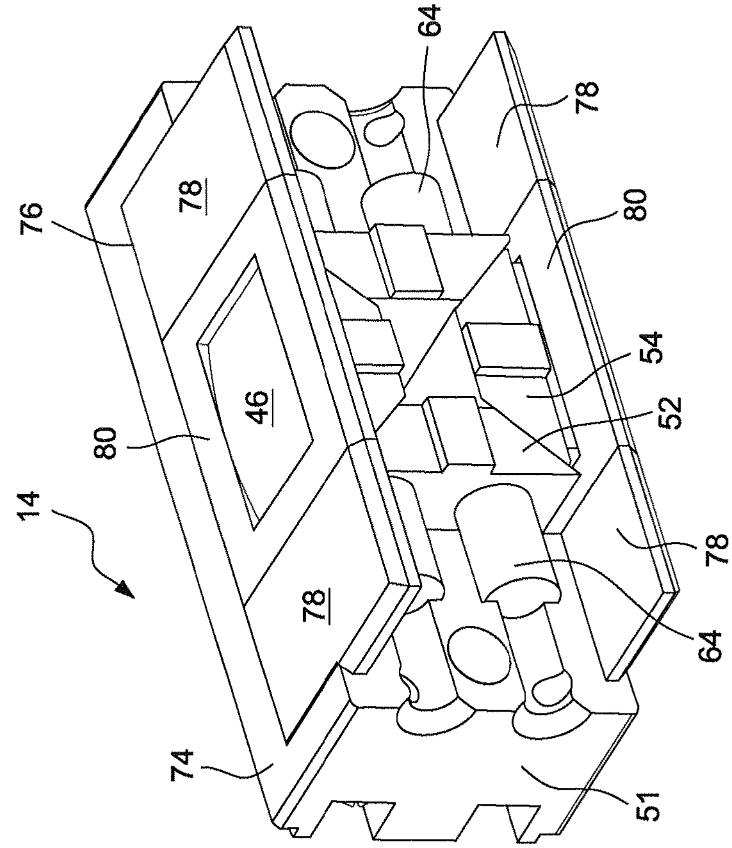
FIG. 9 is a perspective view showing the core with a cover removed.
Figure 8:
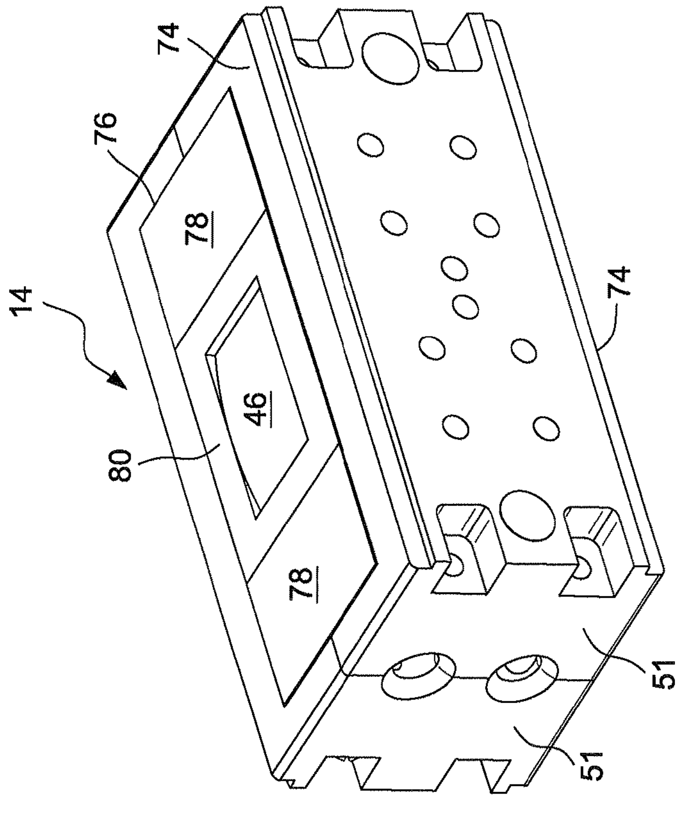
FIG. 8 is a perspective view of the core wherein the core is shown assembled.

FIG. 8 is a perspective view of the core 14 wherein the core is shown assembled. FIG. 9 is a similar perspective view showing the core with one of the covers 51 removed. The opposing covers 51 encase and provide structural support for the trapezoidal conductors 52, 54, and spring assemblies 64.

The sidewalls 74 of the core are formed by the opposing covers 51 and include a recessed center rectangular region 76. Within this region 76 are seated top and bottom secondary arc extinguishers 78 and an arc runner 80. The arc runner 80 may be a panel having a center opening through which extends the contact region 46 of the sidewall 62 (FIG. 6) of one of the trapezoidal conductors 54. The secondary arc extinguishers 78 may be rectangular panels on opposite sides of the arc runner, and formed of a non-conductive material capable of withstanding high temperatures and electrical sparking.

The arc runner directs any electrical arc formed as the contact region 46 slides against the junction connectors 38 (FIG. 1). The electrical arc is directed by the runner to the arc extinguisher 42 and the secondary arc extinguisher 78.

The core 14 in the transfer switch 10 is a linear transfer device that may serve as a linear automatic transfer switch (LATS). The core 14 forms two contacts between a power source and a load based on the opposite contacts 46 of the core. When the core moves into or out of engagement of a power source, both contacts of the core come into electrical contact or break electrical contact.

The movement of the core provides a double break feature wherein the separation of two points of contacts creates two arcs as opposed to one arc that would be created with a single point of contact. By having two arcs, the distance of arc elongation is effectively doubled resulting in a greater arc voltage gain with respect to time. The greater arc voltage gain achieves faster interruptions in the current through the switch than occurs with smaller arc voltage gains that may occur with cores having a single point of contacts. While the core may be configure to have a single point of contact, the two contacts of the core 14 provide a quicker break in current when the core is moved by the switch.

The transfer switch 10 may be formed without conductive braided components and without requiring the braiding of conductive components in the switch. Further, the transfer switch may be formed without a silver based contact pad between the core and the junction connectors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transfer switch comprising:

a bus bar;

a track parallel to the bus bar;

a first power source connection proximate to the track;

a second power source connection proximate to the track offset along the track from the first power source connection;

a conductive core slidably coupled to the track, wherein the core includes a deformable array of conductive sections and the array includes contacting surfaces on opposite sides of the array, wherein the conductive core has a first position providing a conductive coupling between the bus bar and the first power source, wherein the second power source is electrically isolated from the bus bar when the core is in the first position;

wherein the conductive core has a second position providing a conductive coupling between the bus bar and the second power source, wherein the first power source is electrically isolated from the bus bar when the core is in the first position, and wherein the core slides along the track between the first position and the second position.

2. The transfer switch as in claim 1 wherein the deformable array is an array of trapezoidal conductors having abutting surfaces.

3. The transfer switch as in claim 2 wherein the trapezoidal conductors include opposing first trapezoidal conductors each having one of the contact surfaces and opposing second trapezoidal conductors each extending between the first trapezoidal conductors.

4. The transfer switch as in claim 2 wherein the abutting surfaces are planar surfaces.

5. The transfer switch as in claim 2 wherein the abutting surfaces are oblique to a plane of the contacting surfaces.

6. The transfer switch as in claim 5 wherein the abutting surfaces are at an angle of 45 degrees with respect to the contacting surfaces.

7. The transfer switch as in claim 1 further comprising a spring applying a bias force against the deformable array, wherein the bias force moves the contacting surfaces outward.

8. The transfer switch as in claim 1 wherein deformable array is housed in a core body formed of a non-conductive material.

9. The transfer switch as in claim 1 further comprising a pair of arc extinguishers adjacent each of the contacting surfaces when the core is in the first position and a second pair of arc extinguishers adjacent each of the contacting surfaces when the core is in the second position.

10. A transfer switch comprising:

a main body having a back plate and a cover, parallel the back plate and separated from the back plate by brackets extending between the back plate and cover;

a bus bar mounted to the back plate;

a first power source connection mounted to the back plate;

a second power source connection mounted to the back plate;

a track integral or mounted to the back plate, wherein the bus bar is on one side of the track and the first and second power connectors are on the opposite side of the track;

a conductive core slidably coupled to the track, wherein the core includes a deformable array of conductive sections and the array includes contacting surfaces on opposite sides of the array, wherein the conductive core has a first position providing a conductive coupling between the bus bar and the first power source, wherein the second power source is electrically isolated from the bus bar when the core is in the first position;

wherein the conductive core has a second position providing a conductive coupling between the bus bar and the second power source, wherein the first power source is electrically isolated from the bus bar when the core is in the first position, and wherein the core slides along the track between the first position and the second position.

11. The transfer switch as in claim 10 wherein the deformable array is an array of trapezoidal conductors having abutting surfaces.

12. The transfer switch as in claim 11 wherein the trapezoidal conductors include opposing first trapezoidal conductors each having one of the contact surfaces and opposing second trapezoidal conductors each extending between the first trapezoidal conductors.

13. The transfer switch as in claim 11 wherein the abutting surfaces are planar surfaces.

14. The transfer switch as in claim 10 further comprising a spring applying a bias force against the deformable array, wherein the bias force moves the contacting surfaces outward.

15. The transfer switch as in claim 10 further comprising a pair of arc extinguishers adjacent each of the contacting surfaces when the core is in the first position and a second pair of arc extinguishers adjacent each of the contacting surfaces when the core is in the second position.

16. A method to transfer a power supply connection comprising:

establishing a first electrical connection between a power load and a first power source, wherein the connection includes a conductive core having opposite contacting surfaces and the current flows from the first power, through a first of the contacting surfaces, the core, the second of the contacting surfaces and to the power load;

applying a bias force to deform the core and thereby press the contacting surfaces against respective electrical contacts for the power load and first power source;

sliding the core out of contact with the first power source and into contact with the second power source, wherein the sliding breaks the electrical connection between the power load and the first power source and establishes a second electrical connection between the power load and second power source.

17. The method of claim 16 wherein the core includes a deformable array of trapezoidal conductors having abutting surfaces, and the applied bias force slides the conductors along the abutting surfaces.

18. The method of claim 17 wherein the trapezoidal conductors include opposing first trapezoidal conductors and opposing second trapezoidal conductors each extending between the first trapezoidal conductors, wherein the bias force is applied to at least one of the second trapezoidal conductors.

19. The method of claim 16 further comprising extinguishing electrical arcs occurring as the core slides by a pair of arc extinguishers adjacent each side of the core when establishing the first electrical connection and a second pair of arc extinguishers adjacent the sides of the core when establishing the second electrical connection.

20. The method of claim 16 wherein the sliding of the core is a linear sliding motion.

* * * * *